United States Patent
Park et al.

(10) Patent No.: US 9,319,123 B2
(45) Date of Patent: Apr. 19, 2016

(54) METHOD FOR RECEIVING REFERENCE SIGNAL AND USER EQUIPMENT, AND METHOD FOR TRANSMITTING REFERENCE SIGNAL AND BASE STATION

(75) Inventors: Sungho Park, Anyang-si (KR); Binchul Ihm, Seoul (KR); Sunam Kim, Seoul (KR); Jiwon Kang, Seongnam-si (KR); Jinyoung Chun, Seongnam-si (KR); Kitae Kim, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 231 days.

(21) Appl. No.: 14/116,625

(22) PCT Filed: May 10, 2012

(86) PCT No.: PCT/KR2012/003661
§ 371 (c)(1),
(2), (4) Date: Dec. 3, 2013

(87) PCT Pub. No.: WO2012/153988
PCT Pub. Date: Nov. 15, 2012

(65) Prior Publication Data
US 2014/0112177 A1    Apr. 24, 2014

Related U.S. Application Data

(60) Provisional application No. 61/484,633, filed on May 10, 2011.

(51) Int. Cl.
*H04B 7/06* (2006.01)
*H04W 52/14* (2009.01)
(Continued)

(52) U.S. Cl.
CPC .............. *H04B 7/0626* (2013.01); *H04B 17/24* (2015.01); *H04L 5/0048* (2013.01);
(Continued)

(58) Field of Classification Search
None
See application file for complete search history.

(56) References Cited

U.S. PATENT DOCUMENTS

2011/0305161 A1* 12/2011 Ekpenyong ........... H04L 1/0031
                                                            370/252
2012/0033608 A1   2/2012 Seo et al.
(Continued)

FOREIGN PATENT DOCUMENTS

| KR | 10-2010-0111608 A | 10/2010 |
| KR | 10-2010-0121445 A | 11/2010 |
| WO | WO 2010/123282 A2 | 10/2010 |

OTHER PUBLICATIONS

3rd Generation Partnership Project; Technical Specification Group Radio Access Network; Evolved Universal Terrtestrial Radio Access (E-UTRA); Physical Layer Procedures (Release 10). 3GPP TS 36.213 V10.1.0 (Mar. 2011), 115 pages.

*Primary Examiner* — Min Jung
(74) *Attorney, Agent, or Firm* — Birch, Stewart, Kolasch & Birch, LLP

(57) ABSTRACT

The present invention relates to a method and apparatus for transmitting a channel measurement reference signal for measuring channel state from user equipment, and a method and apparatus for receiving the channel measurement reference signal. The base station of the present invention transmits power information concerning a plurality of nodes to user equipment capable of receiving signals from the plurality of nodes, and the plurality of nodes each transmit respective channel measurement reference signals. The power Information includes channel measurement reference signal, transmission power for each of the plurality of nodes and information indicating downlink data transmission power ratios. The user equipment calculates channel state information on the plurality of nodes based on the power Information and the channel measurement reference signals from the plurality of nodes.

8 Claims, 5 Drawing Sheets

(51) Int. Cl.
*H04W 52/16* (2009.01)
*H04W 52/32* (2009.01)
*H04B 17/24* (2015.01)
*H04L 1/00* (2006.01)
*H04L 5/00* (2006.01)
*H04W 24/10* (2009.01)

(52) U.S. Cl.
CPC ........... *H04W 52/143* (2013.01); *H04W 52/16* (2013.01); *H04W 52/325* (2013.01); *H04L 1/0038* (2013.01); *H04L 5/001* (2013.01); *H04L 5/0023* (2013.01); *H04L 5/0053* (2013.01); *H04W 24/10* (2013.01)

(56) References Cited

U.S. PATENT DOCUMENTS

| | | | |
|---|---|---|---|
| 2012/0034926 A1* | 2/2012 | Damnjanovic | H04B 7/022 455/450 |
| 2012/0051451 A1 | 3/2012 | Kwon et al. | |
| 2012/0063336 A1* | 3/2012 | Shany | H04B 7/0452 370/252 |
| 2012/0208541 A1* | 8/2012 | Luo | H04W 72/082 455/437 |
| 2012/0281556 A1* | 11/2012 | Sayana | H04B 7/024 370/252 |
| 2013/0094384 A1* | 4/2013 | Park | H04L 1/0026 370/252 |
| 2013/0286997 A1* | 10/2013 | Davydov | H04B 7/024 370/329 |
| 2013/0315197 A1* | 11/2013 | Park | H04W 72/042 370/329 |
| 2014/0064201 A1* | 3/2014 | Zhu | H04B 7/0486 370/329 |
| 2014/0321306 A1* | 10/2014 | Nam | H04L 1/0003 370/252 |

* cited by examiner

METHOD FOR RECEIVING REFERENCE SIGNAL AND USER EQUIPMENT, AND METHOD FOR TRANSMITTING REFERENCE SIGNAL AND BASE STATION

CROSS REFERENCE TO RELATED APPLICATIONS

This non-provisional application is a National Stage entry under U.S.C. §371 of International Application No. PCT/KR2012/003661 filed on May 10, 2012, which claims the benefit of U.S. Provisional Application No. 61/484,633 filed on May 10, 2011. The entire contents of all of the above applications are hereby incorporated by reference.

TECHNICAL FIELD

The present invention relates to a wireless communication system. More specifically, the present invention relates to a method and apparatus for transmitting/receiving a reference signal for channel estimation in a multi-node system supporting multi-node cooperative transmission and a method and apparatus for transmitting/receiving channel state information.

BACKGROUND ART

With appearance and spread of machine-to-machine (M2M) communication and a variety of devices such as smartphones and tablet PCs demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have developed.

Meanwhile, a communication environment has evolved into increasing density of nodes accessible by a user at the periphery of the nodes. A communication system including high-density nodes may provide a better communication service to the user by cooperation between the nodes. Such a multi-node cooperation communication scheme performing communication with a user equipment (UE) using the same time-frequency resource in plurality of nodes provides much better performance than a conventional communication scheme in which each node operates as an independent BS to perform communication with the UE without mutual cooperation.

As opposed to a conventional centralized antenna system (CAS) (i.e. a single node system) in which antennas are centralized in a BS, a plurality of nodes in a multi-node system is generally separated by a predetermined interval or more. The plurality of nodes may be managed by one or more BSs or BS controllers for controlling operation of each node or scheduling data to be transmitted/received through each node. Each node is connected via a cable or a dedicated line to the BSs or BS controller for managing the node.

Such a multi-node system may be considered a sort of a MIMO system in that distributed nodes may communicate with a single UE or plurality of UEs by simultaneously transmitting/receiving different data streams. Nonetheless, signals are transmitted using nodes distributed at various positions in the multi-node system and thus a transmission region that should be covered by each antenna is reduced relative to antennas included in the conventional CAS. Accordingly, compared with a conventional system implementing MIMO technology in the CAS, transmit power needed when each antenna transmits signals may be reduced in the multi-node system. In addition, since the transmission distance between the antenna and the UE is shortened, path loss is reduced and data can be transmitted at high rate. Then, transmission capacity and power efficiency of a cellular system can increase and communication performance of relatively uniform quality can be achieved irrespective of position of a user in a cell. In the multi-node system, a BS(s) or a BS controller(s) connected to a plurality of nodes cooperatively performs data transmission/reception and therefore signal loss generated in a transmission process is reduced. If nodes separated by a predetermined distance or more cooperatively perform communication with the UE, correlation and interference between antennas is also reduced. Therefore, according to a multi-node cooperative communication scheme, a high signal to interference-plus-noise ratio (SINR) can be obtained.

Due to such advantages of the multi-node system, the multi-node system is used together with or replaces the conventional CAS to emerge as a new base of cellular communication, in order to reduce costs for installing more BSs and maintaining a backhaul network in a next-generation mobile communication system and to improve extend coverage improve SINR.

DETAILED DESCRIPTION OF THE INVENTION

Technical Problems

In order for a BS or a BS controller to efficiently perform cooperative transmission to a UE, using some or all nodes among a plurality of nodes located in the vicinity of the UE, the BS or BS controller should be aware of information about a channel state formed between the some nodes and the UE. Since a multi-node system has not been considered up to now, a method for deriving channel information regarding the plurality of nodes has not been defined. Accordingly, a method for measuring/reporting, at the UE, channel state information regarding the plurality of nodes distributed in the multi-node system needs to be defined.

The technical objects that can be achieved through the present invention are not limited to what has been particularly described hereinabove and other technical objects not described herein will be more clearly understood by persons skilled in the art from the following detailed description.

Technical Solutions

In one aspect of the present invention, provided herein is a method for receiving a reference signal for channel measurement at a user equipment receiving signals from a plurality of nodes from a base station for controlling at least one of the plurality of nodes, including receiving power information for the plurality of nodes from the base station; and deriving channel state information for the plurality of nodes based on the power information and reference signals for channel measurement received from the plurality of nodes, wherein the power information includes information indicating the ratio of downlink data transmit power to reference signal transmit power of each of the plurality of nodes.

In another aspect of the present invention, provided herein is a user equipment for receiving a reference signal for channel measurement from a base station for controlling at least one of a plurality of nodes, the user equipment receiving signals from the plurality of nodes and including a radio frequency (RF) unit configured to transmit or receive a radio signal; and a processor configured to control the RF unit, wherein the processor controls the RF unit to receive power information for the plurality of nodes from the base station and derives channel state information for the plurality of nodes based on the power information and reference signals for channel measurement received from the plurality of nodes, and wherein the power information includes information indicating the ratio of downlink data transmit power to reference signal transmit power of each of the plurality of nodes.

In another aspect of the present invention, provided herein is a method for transmitting a reference signal for channel measurement at a base station for controlling at least one of a plurality of nodes to a user equipment receiving signals from the plurality of nodes, including transmitting power information for the plurality of nodes to the user equipment; controlling the plurality of nodes to transmit the reference signal for channel measurement according to the power information; and receiving channel state information for the plurality of nodes, determined based on the reference signal for channel measurement, from the user equipment, wherein the power information includes information indicating the ratio of downlink data transmit power to reference signal transmit power of each of the plurality of nodes.

In another aspect of the present invention, provided herein is a base station for transmitting a reference signal for channel measurement to a user equipment receiving signals from a plurality of nodes, the base station controlling at least one of the plurality of nodes and including a radio frequency (RF) unit configured to transmit or receive a radio signal; and a processor configured to control the RF unit, wherein the processor controls the RF unit to transmit power information for the plurality of nodes to the user equipment and controls the plurality of nodes to transmit the reference signal for channel measurement according to the power information; and receives channel state information for the plurality of nodes, determined based on the reference signal for channel measurement, from the user equipment, and wherein the power information includes information indicating the ratio of downlink data transmit power to reference signal transmit power of each of the plurality of nodes.

According to each aspect of the present invention, the plurality of nodes may be categorized into one or more node groups according to the ratio of downlink data transmit power to reference signal transmit power for channel measurement and the power information may include at least one ratio of downlink data transmit power to reference signal transmit power per node group.

According to each aspect of the present invention, the power information may include two or more ratios of downlink data transmit power to reference signal transmit power with respect to at least one of the plurality of nodes.

According to each aspect of the present invention, the two or more ratios of downlink data transmit power to reference signal transmit power may include the ratio in an even-numbered subframe and the ratio in an odd-numbered subframe.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, a UE can accurately calculate a channel state between the UE and a node transmitting data to the UE and report the channel state to a BS or a BS controller.

According to the present invention, the BS or the BS controller can more accurately recognize the channel state and thus can efficiently communicate with a UE (UEs) located in an associated cell through a plurality of nodes controlled by the BS or the BS controller.

Namely, according to the present invention, data throughput performance of a multi-node system can be improved.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
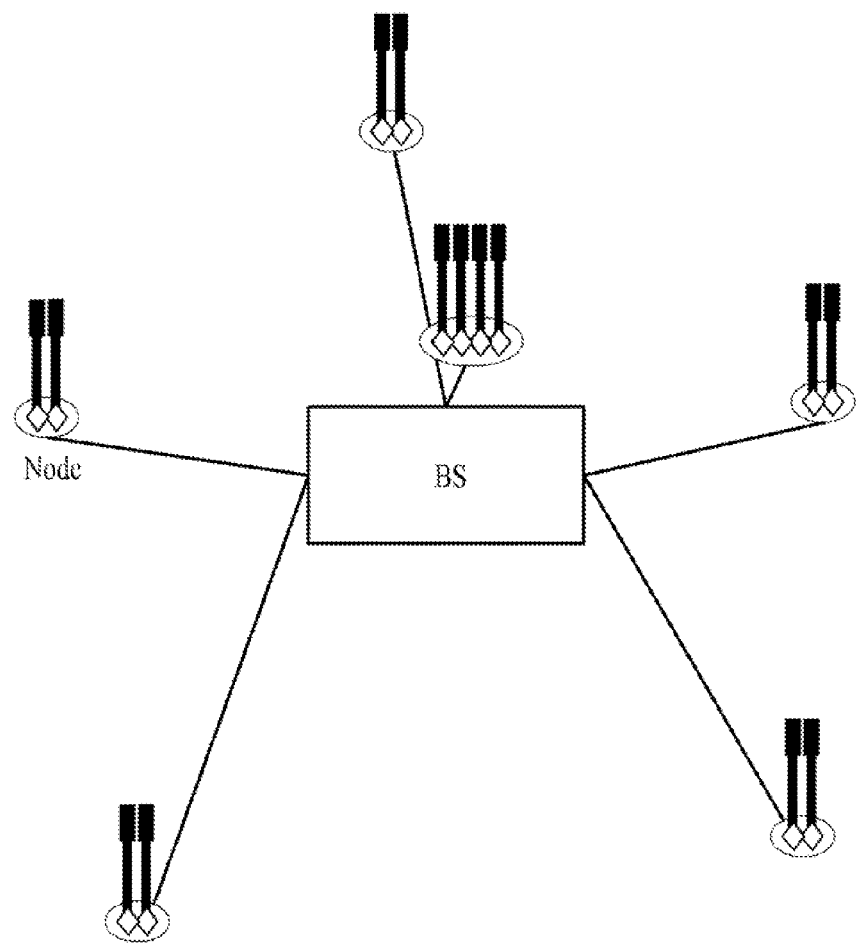
FIG. 1 illustrates an exemplary configuration of a multi-node system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), or a processing server (PS).

In the present invention, a frame refers to a structured data sequence having a fixed duration, used by a few physical layer (PHY) standards. One frame may include a predetermined number of subframes and one subframe may include one or more slots. One subframe/slot may be configured to include a plurality of orthogonal frequency division multiplexing (OFDM) symbols in the time domain. For example, one subframe may be composed of two slots, each of which includes 7 OFDM symbols. The number of subframes per frame, the number of slots per subframe, and the number of OFDM symbols per slot are determined according to PHY standards of an associated system. For instance, one slot of a 3GPP LTE(-A) system includes 7 OFDM symbols in the case of a normal cyclic prefix (CP) and 6 OFDM symbols in the case of an extended CP. A subframe/slot includes a plurality of resource blocks (RBs) or resource units (RUs) in the frequency domain. Particularly, one RB in the 3GPP LTE(-A) system occupies one slot in the time domain and 12 consecutive subcarriers in the frequency domain. For reference, a time-frequency resource composed of one OFDM symbol and one subcarrier in the 3GPP LTE(-A) system is referred to as a resource element (RE).

Hereinafter, a time-frequency resource or RE that is assigned to transmit a physical downlink control channel (PDCCH)/physical downlink shared channel (PDSCH) will be referred to as a PDCCH/PDSCH RE and a time-frequency resource or RE that is used to transmit a reference signal (RS) will be referred to as an RS resource or an RS RE. In the present invention, a PDCCH/PDSCH refers to a set of time-frequency resources carrying downlink control information/data. In the present invention, PDCCH/PDSCH transmission of a BS refers to transmission of a downlink control/data signal on a PDCCH/PDSCH.

In the present invention, if a specific signal is allocated to a frame/subframe/slot/carrier/subcarrier, this means that the specific signal is transmitted through a corresponding carrier/subcarrier during duration/timing of a corresponding frame/subframe/slot/symbol.

Meanwhile, in the present invention, a cell refers to a prescribed geographic region to which one BS or node(s) provides a communication service. Hence, in the present invention, communication with a specific cell may mean communication with a BS or a node that provides a communication service to the specific cell. Moreover, a downlink/uplink signal of a specific cell refers to a downlink/uplink signal from/to a BS or a node that provides a communication service to the specific cell. In addition, a channel state/quality of a specific cell refers to a channel state/quality of a channel or a communication link formed between a BS or a node and a UE that provides a communication service to the specific cell.

FIG. 1 illustrates an exemplary configuration of a multi-node system. Specifically, FIG. 1 illustrates a distributed multi-node system (DMNS) among multi-node systems.

Referring to FIG. 1, in the DMNS, a plurality of nodes separated by a predetermined interval or more in a prescribed geographic region is connected to one BS or BS controller through cables or dedicated lines. That is, one controller manages transmission/reception through all nodes located within the prescribed geographic region.

In the DMNS, if nodes have the same cell identifier (ID), i.e. if the same cell ID is used for signal transmission through the nodes, each node operates as a partial antenna group of one cell in the DMNS. In the DMNS, each node may be assigned an additional node ID or may operate as partial antennas in a cell without the additional node ID.

On the other hand, if nodes in the DMNS have different cell IDs, the DMNS may be regarded as a multi-cell (e.g. macro-cell/femto-cell/pico-cell) system. If multiple cells formed by each of a plurality of nodes are configured in an overlaid form according to coverage thereof, a network formed by the multiple cells is particularly referred to as a multi-tier network.

Meanwhile, only a distributed antenna or antenna group cannot always be a node. Various types of BSs may be used as nodes irrespective of names thereof. That is, a BS, an NB, an eNB, a pico-cell eNB (PeNB), a home eNB (HeNB), a relay, a repeater, etc. may form a node. In addition, devices other than the BS can become a node. For example, a radio remote head (RRH) or a radio remote unit (RRU) may be a node. At least one antenna is installed per node. The antenna may refer to a physical antenna or refer to an antenna port, a virtual antenna, or an antenna group. A node may also be referred to as a point. Hereinafter, a node separated by a prescribed distance from the BS, rather than a node at which a BS to which a UE is connected is located, will be referred to as a distributed node (dNode).

In FIG. 1, one controller manages transmission/reception through all nodes within a prescribed geographic region. However, nodes performing cooperative communication need not always be managed by one controller. Embodiments of the present invention may be applied even when nodes controlled by different BSs or different BS controllers perform cooperative communication. That is, in the multi-node system according to the present invention, one or more BSs or BS controllers connected to a plurality of nodes may control the plurality of nodes to simultaneously transmit signals to a UE or simultaneously receive signals from the UE, through a portion among the plurality of nodes. Hereinafter, a node that transmits a downlink signal to a UE or receives an uplink signal from the UE will be referred to as a serving node.

Although there are differences between multi-node systems according to a substantial type of each node, i.e. an implementation form of each node, the multi-node systems differ from single-node systems (e.g. a CAS, conventional MIMO system, conventional relay system, conventional repeater system, etc.) in that multiple nodes participate in providing a communication service to a UE on a prescribed time-frequency resource. Accordingly, embodiments of the present invention related to a method for performing cooperative data transmission using some or all of a plurality of nodes may be applied to various types of multi-node systems. For example, while a node generally refers to an antenna group separated from another node by a prescribed interval or more, the embodiments of the present invention may be applied even when a node refers to an arbitrary antenna group irrespective of the interval. For example, if a BS includes a cross-polarized (X-pol) antenna, the embodiments of the present invention may be applied by interpreting that the BS controls a node composed of a horizontally-polarized (H-pol) antenna and a node composed of a vertically-polarized (V-pol) antenna.

A scheme capable of transmitting/receiving data through a plurality of transmission (Tx)/reception (Rx) nodes is referred to as multi-BS MIMO or coordinated multi-point Tx/Rx (CoMP). Among cooperative communication schemes between nodes, a cooperative transmission scheme may be categorized into joint processing (JP) and scheduling coordination. The former may be divided into joint transmission (JT) and dynamic cell selection (DCS) and the latter may be divided into coordinated scheduling (CS) and coordinated beamforming (CB). Relative to other cooperative communication schemes, more various communication environments may be formed when JP, among the cooperative communication schemes between nodes, is performed.

A DMNS, which is based on current 3GPP LTE(-A), may be classified as follows according to cell ID sharing and node transmit power.

1) Homogeneous network with high transmit power RRHs (different cell IDs and high-power nodes)

2) Heterogeneous network with low transmit power RRHs within macro cell coverage (different cell IDs and low-power nodes)

3) Network with low transmit power RRHs within macro cell coverage in which Tx/Rx points created by the RRHs have the same cell ID as a macro cell.

Additionally, a homogeneous network with intra-cite CoMP may be present. However, this network overlaps with the homogeneous network with high Tx power RRHs described in 1) and therefore description thereof is omitted herein.

The homogeneous network refers to a network composed of macro BSs or a network composed of micro BSs. The heterogeneous network refers to a network in which macro BSs and micro BSs coexist even when the same radio access technology (RAT) is used. A macro BS refers to a general BS of a wireless communication system, having wide coverage (service providing area) and high Tx power. A geographic region to which the macro BS provides a communication service may be referred to as a macro cell. In contrast, a micro BS is a small-scale version of the macro BS and may independently operate while performing most of the functions of the macro BS. The micro BS may be installed in an area covered by the macro BS (overlay type) or may be installed in a shadow area that cannot be covered by the macro BS (non-overlay type). The micro BS has narrower coverage and lower transmit power than the macro BS and may accommodate fewer UEs than the macro BS. The micro BS may be installed by a network operator or may be installed by an entity regardless of the network operator to permit access by a specific subscriber. For example, each of a pico BS, a femto BS, a home eNB (HeNB), and a relay may be the micro BS. A geographic region to which the micro BS provides a communication service may be referred to as a micro cell, a pico cell, a femto cell, etc.

Figure 2:
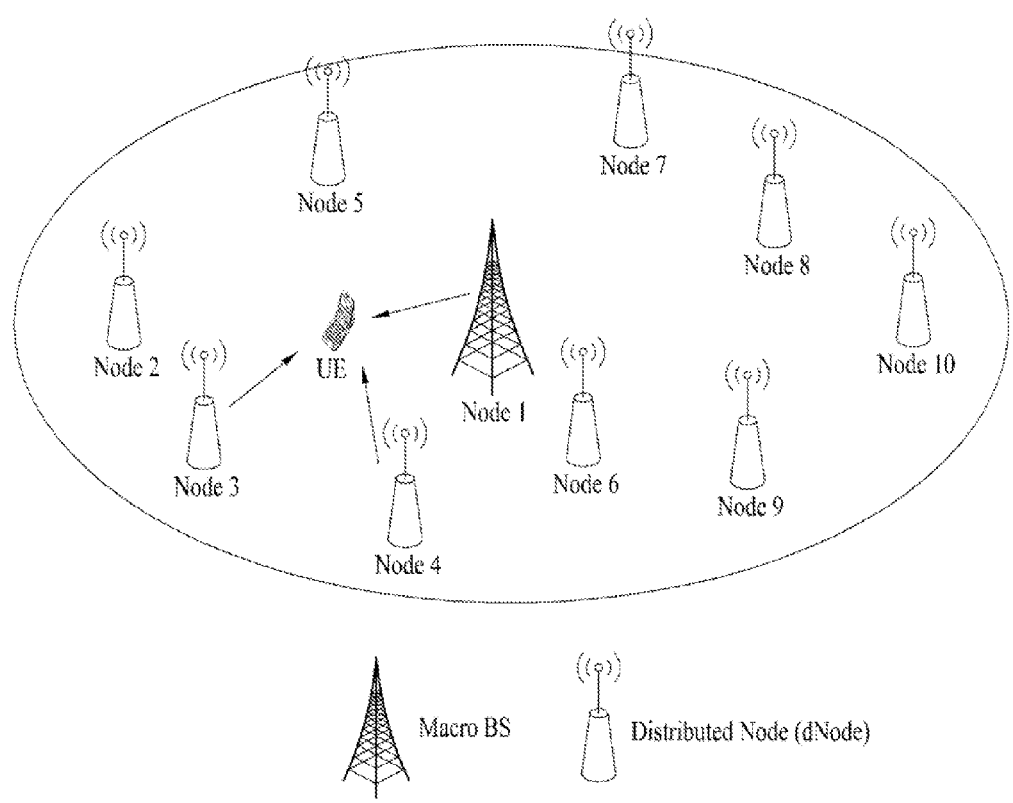
FIG. 2 illustrates an example of DMNS deployment.

FIG. 2 illustrates an example of DMNS deployment.

Referring to FIG. 2, a plurality of nodes (Node 1 to Node 10) is present in the vicinity of a UE and the UE may be connected to a portion of the nodes. For example, if the UE is connected to Nodes 1, 3, and 4 from among Node 1 to Node 10, the UE may report channel state information of Nodes 1, 3, and 4, to a network. That is, the UE transmits the channel state information of the nodes to a BS to which the UE is connected. The network performs UE scheduling based on the channel state information. In the present invention, channel state information refers to information capable of indicating quality of a radio channel (also called a link) formed between the UE and a node. For example, the channel state information may include a channel quality indicator (CQI), a rank index (RI), a precoding matrix index (PMI), etc.

For mitigation of an interference signal, estimation of a channel state between a BS and a UE, and demodulation of a signal transmitted between the BS and the UE, various reference signals (RSs) are transmitted between the BS and the UE. An RS refers to a signal of a specific waveform, that is transmitted from the BS to the UE or from the UE to the BS and is predefined so as to be known to the BS and the UE. The RS is also referred to as a pilot. In 3GPP LTE release 8 (hereinafter, Rel-8), a cell specific RS (CRS) is proposed for the purpose of channel measurement for CQI feedback and channel estimation for a PDSCH. However, since 3GPP LTE release 10 (hereinafter, Rel-10), a channel state information RS (CSI-RS) has been proposed for the purpose of a PDSCH for a UE configured to conform to Rel-10, separately from the CRS of Rel-8.

CSI-RS positions of contiguous cells should be prevented from overlapping so that CSI-RS transmission between contiguous cells does not collide. Therefore, time-frequency resources to which CSI-RSs of contiguous cells are allocated are preferably orthogonal. Orthogonality of CSI-RSs may be obtained by mapping the CSI-RSs to radio resources so that CSI-RSs transmitted by contiguous cells do not overlap in a predetermined time/frequency resource region (e.g. an RB). Hereinafter, an antenna port carrying a CSI-RS will be referred to as a CSI-RS port and positions of resources in a prescribed resource region in which CSI-RS port(s) transmits corresponding CSI-RS(s) will be referred to as a CSI-RS pattern or a CSI-RS configuration. In addition, a time-frequency resource to/on which a CSI-RS is allocated/transmitted will be referred to as a CSI-RS resource. For example, an RE used for CSI-RS transmission is referred to as a CSI-RS RE. Although an RE position at which a CRS per antenna port is transmitted is fixed, a CSI-RS has a maximum of 32 different configurations in order to reduce inter-cell interference (ICI) in a multi-cell environment including a heterogeneous network environment. A CSI-RS configuration differs according to the number of antenna ports in a cell and contiguous cells are configured differently as much as possible. Unlike a CRS, a CSI-RS supports up to 8 antenna ports (p=15, p=15,16, p=15, ..., 18 and p=15, ..., 22) and is defined only with respect to $\Delta f=15$ kHz. Antenna ports p=15, ..., 22 may correspond to CSI-RS ports p=0, ..., 7 hereinbelow.

Table 1 and Table 2 show CSI-RS configurations capable of being used in a frequency division duplexing (FDD) frame structure (hereinafter, FS-1) and a time division duplexing (TDD) frame structure (hereinafter, FS-2). Specifically, Table 1 shows CSI-RS configurations in a subframe having a normal CP and Table 2 shows CSI-RS configurations in a subframe having an extended CP.

TABLE 1

| | | Number of CSI-RSs configured | | | | | |
|---|---|---|---|---|---|---|---|
| | | 1 or 2 | | 4 | | 8 | |
| | CSI-RS configuration | (k', l') | $n_s$ mod2 | (k', l') | $n_s$ mod2 | (k', l') | $n_s$ mod2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS-2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |

TABLE 1-continued

| CSI-RS configuration | Number of CSI-RSs configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| CSI-RS configuration | Number of CSI-RSs configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

In Table 1 and Table 2, if (k',l') (where k' is a subcarrier index in an RB and l' is an OFDM symbol index in a slot) and $n_s$ (where $n_s$ is a slot index in a frame) are applied to the following equation, a time-frequency resource used by each CSI-RS port for corresponding CSI-RS transmission may be determined. That is, in a slot $n_s$ in a subframe configured for CSI-RS transmission (hereinafter, a CSI-RS subframe), a CSI-RS sequence may be mapped to complex-valued modulation symbols $a^{(p)}_{k,l}$ used as reference symbols on a CSI-RS port p, as indicated by the following equation.

$$a_{k,l}^{(p)} = w_{l''} \cdot r_{l,n_s}(m') \quad \text{[Equation 1]}$$

In Equation 2, a resource index pair (k,l) (where k is a subcarrier index and l is an OFDM symbol index in a subframe) used by a CSI-RS port p for CSI-RS transmission may be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases} \quad \text{[Equation 2]}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Figure 3:
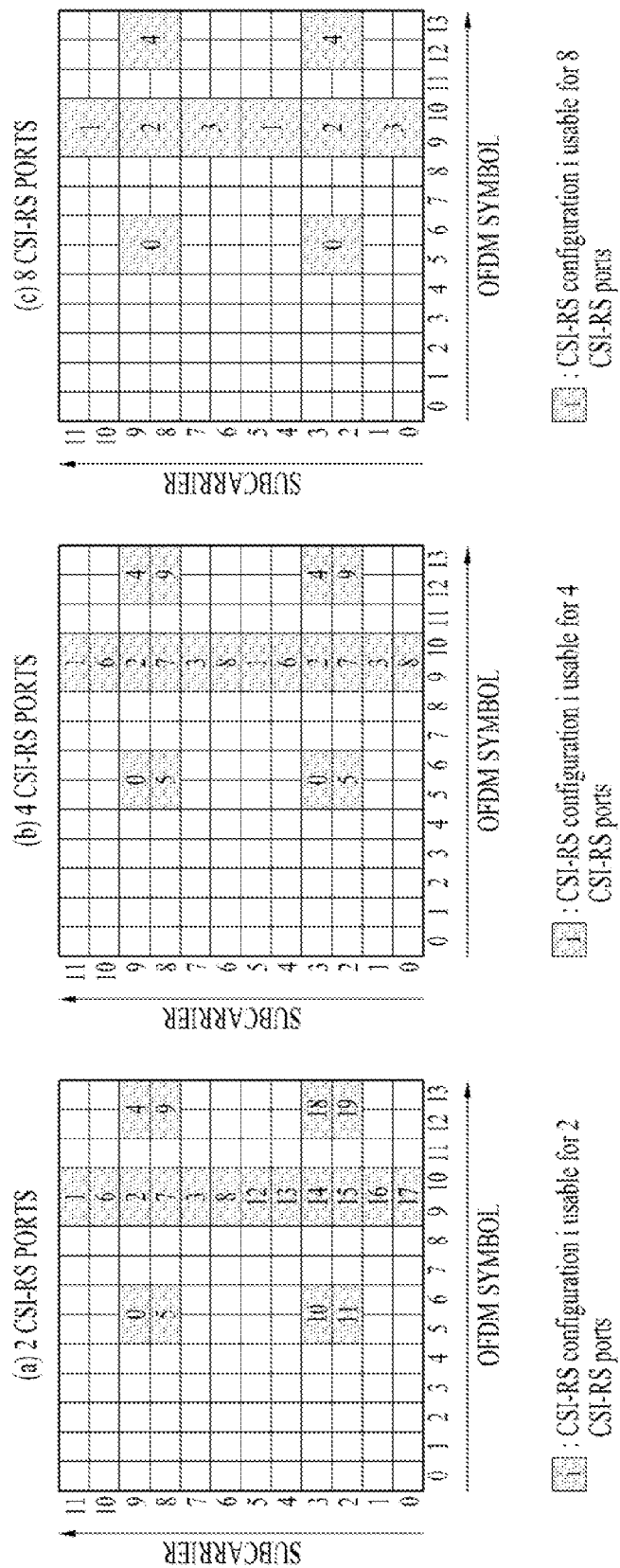
FIG. 3 illustrates CSI-RS configurations.

FIG. 3 illustrates CSI-RS configurations. Specifically, FIG. 3 illustrates CSI-RS configurations according to Equation 1 and Table 1 and shows positions of resources occupied by CSI-RSs in one RB pair according to each CSI-RS configuration.

Referring to FIG. 3, FIG. 3(a) illustrates 20 CSI-RS configurations usable for CSI-RS transmission by two CSI-RS ports, FIG. 3(b) illustrates 10 CSI-RS configurations usable for CSI-RS transmission by 4 CSI-RS ports, and FIG. 3(c) illustrates 5 CSI-RS configurations usable for CSI-RS transmission by 8 CSI-RS ports. Each CSI-RS configuration defined according to the number of CSI-RS ports may be assigned a number.

If a BS configures two antenna ports for CSI-RS transmission, i.e. two CSI-RS ports, the two CSI-RS ports perform CSI-RS transmission on radio resources corresponding to one of the 20 CSI-RS configurations shown in FIG. 3(a). If the number of CSI-RS ports configured for a specific cell is 4, the 4 CSI-RS ports transmit a CSI-RS on resources of a CSI-RS configuration for the specific cell among the 10 CSI-RS configurations shown in FIG. 3(b). Similarly, if the number of CSI-RS ports configured for the specific cell is 8, the 8 CSI-RS ports transmit a CSI-RS on resources of a CSI-RS configuration for the specific cell among the 5 CSI-RS configurations shown in FIG. 3(c).

The CSI-RS configurations of Table 1 and Table 2 have nested properties. Nested properties indicate that CSI-RS configurations for a large number of CSI-RS ports is a super set of CSI-RS configurations for a small number of CSI-RS ports. Referring to FIGS. 3(b) and 3(c), for example, REs constituting CSI-RS configuration 0 for 4 CSI-RS ports are included in resources constituting CSI-RS configuration 0 for 8 CSI-RS ports.

A plurality of CSI-RSs may be used in a given cell. In the case of a non-zero power CSI-RS, only a CSI-RS for one configuration is transmitted. In the case of a zero power CSI-RS, CSI-RSs for plurality of configurations may be transmitted. Among resources corresponding to a zero power CSI-RS, the UE assumes zero transmit power with respect to resources except for resources that should be assumed to be a non-zero power CSI-RS. For example, in a radio frame for TDD, no CSI-RSs are transmitted in a special subframe in which downlink transmission and uplink transmission coexist, a subframe in which a paging message is transmitted, and a subframe in which transmission of a synchronization signal, a physical broadcast channel (PBCH), or system information block type 1 (SIB1) collides with CSI-RS transmission. The UE assumes that CSI-RSs are not transmitted in these subframes. Meanwhile, time-frequency resources used by a CSI-RS port for corresponding CSI-RS transmission are not used for PDSCH transmission on any antenna port and are not used for CSI-RS transmission of other antenna ports except for the corresponding CSI-RS port.

Since time-frequency resources used for CSI-RS transmission cannot be used for data transmission, data throughput decreases as CSI-RS overhead increases. In consideration of this fact, a CSI-RS is configured to be transmitted not in every frame but at a prescribed transmission periodicity corresponding to a plurality of subframes. In this case, there are advantages of significantly lowering CSI-RS transmission overhead relative to CSI-RS transmission in every subframe. Hereinbelow, a subframe configured for CSI-RS transmission will be referred to as a CSI-RS subframe. The CSI-RS subframe may be defined by a CSI-RS periodicity and a subframe offset. The CSI-RS periodicity and the subframe offset are referred to as a CSI-RS subframe configuration. Table 3 shows a CSI-RS periodicity $T_{CSI-RS}$ and a subframe offset $\Delta_{CSI-RS}$.

TABLE 3

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
| --- | --- | --- |
| $I_{CSI-RS} \leq 4$ | 5 | $I_{CSI-RS}$ |
| $5 \leq I_{CSI-RS} \leq 14$ | 10 | $I_{CSI-RS}-5$ |
| $15 \leq I_{CSI-RS} \leq 34$ | 20 | $I_{CSI-RS}-15$ |
| $35 \leq I_{CSI-RS} \leq 74$ | 40 | $I_{CSI-RS}-35$ |
| $75 \leq I_{CSI-RS} \leq 154$ | 80 | $I_{CSI-RS}-75$ |

In Table 3, the CSI-RS subframe configuration $I_{CSI-RS}$ specifies a CSI-RS periodicity and a subframe offset.

A BS may determine or adjust $I_{CSI-RS}$ and transmit $I_{CSI-RS}$ to UE(s) in coverage of a corresponding cell. A UE can be aware of a CSI-RS subframe in which a CSI-RS of a cell providing a communication service (hereinafter, a serving cell) to the UE is transmitted, based on $I_{CSI-RS}$. The UE may determine a subframe satisfying the following equation as a CSI-RS subframe.

$$(10n_f + \lfloor n_s/2 \rfloor - \Delta_{CSI-RS}) \bmod T_{CSI-RS} = 0 \qquad [\text{Equation 3}]$$

Here, $n_f$ denotes a system frame number and $n_s$ denotes a slot number in a radio frame.

For example, referring to Table 3, if $I_{CSI-RS}$ is a value greater than or equal to 5 and less than or equal to 14, a CSI-RS is transmitted every 10 subframes starting from a subframe having a subframe number $I_{CSI-RS}-5$ in a radio frame.

The BS may inform the UE of the following parameters through higher layer signaling (e.g. media access control (MAC) signaling or radio resource control (RRC) signaling).
 Number of CSI-RS ports
 CSI-RS configuration (e.g. refer to Table 1 and Table 2)
 CSI-RS subframe configuration (e.g. refer to Table 3)
 CSI-RS subframe configuration periodicity $T_{CSI-RS}$
 CSI-RS subframe offset $\Delta_{CSI-RS}$ When necessary, the BS may inform the UE of a CSI-RS configuration transmitted with zero power and a subframe configuration in which the zero power CSI-RS is transmitted. For a zero power CSI-RS configuration, the CSI-RS configuration of Table 1 and Table 2 may be used and the subframe configuration in which a zero power CSI-RS is configured may use the CSI-RS subframe configuration of Table 3.

Communication standards up to now have not considered a multi-node system at all and thus a method for estimating a channel state for nodes in the multi-node system has not been defined. Therefore, a method for accurately measuring CSI for node(s) constituting the multi-node system will be proposed hereinbelow.

In a DMNS, nodes having the same cell ID (e.g. physical cell ID (PCI)) as a macro BS may be distinguished therebetween using any one of a CSI-RS configuration, a CSI-RS subframe configuration, and a CSI-RS port index. For example, the nodes in the DMNS may be distinguished using a CSI-RS as follows.

1) CSI-RS configuration based-multiple CSI-RS configuration signaling:

The BS may signal a CSI-RS configuration for each node to the UE. That is, if the UE is connected to a plurality of nodes, the BS may allocate a different CSI-RS configuration to each of the plurality of nodes. In this case, the BS signals a plurality of CSI-RS configuration indexes to the UE. For example, the BS may allocate CSI-RS configuration 0 to node 1 and CSI-RS configuration 1 to node 2 and signal the allocated CSI-RS configuration indexes to the UE.

2) CSI-RS subframe configuration based-multiple CSI-RS subframe configuration signaling:

The BS may signal a CSI-RS subframe configuration for each node. That is, if the UE is connected to a plurality of nodes, the BS may allocate a different CSI-RS subframe configuration to each of the plurality of nodes. In this case, the BS signals a plurality of CSI-RS subframe configuration indexes to the UE. For example, the BS allocates CSI-RS subframe configuration 0 to node 1 and CSI-RS subframe configuration 1 to node 2 and may signal the allocated CSI-RS subframe configuration indexes to the UE.

3) CSI-RS port based:

The BS maps nodes to which the UE is connected to respective CSI-RS resources and transmits a CSI-RS to the UE through a corresponding node on a CSI-RS resource mapped to the corresponding node. In this case, CSI-RS resources mapped to respective nodes may include a CSI-RS resource per antenna port included in the corresponding node. Alternatively, each CSI-RS resource may be mapped to each node one by one. For example, we assume that the UE is connected to two nodes, node 1 and node 2, and each node includes two antenna ports. In the first case, the BS may allocate a CSI-RS configuration for four CSI-RS ports and (sequentially) map CSI-RS resources according to the CSI-RS configuration to antenna port 0 of node 1, antenna port 1 of node 1, antenna port 0 of node 2, and antenna port 1 of node 2. In the second case, the BS may allocate a CSI-RS configuration for two CSI-RS ports and (sequentially) map each CSI-RS resource to node 1 and node 2.

Figure 4:
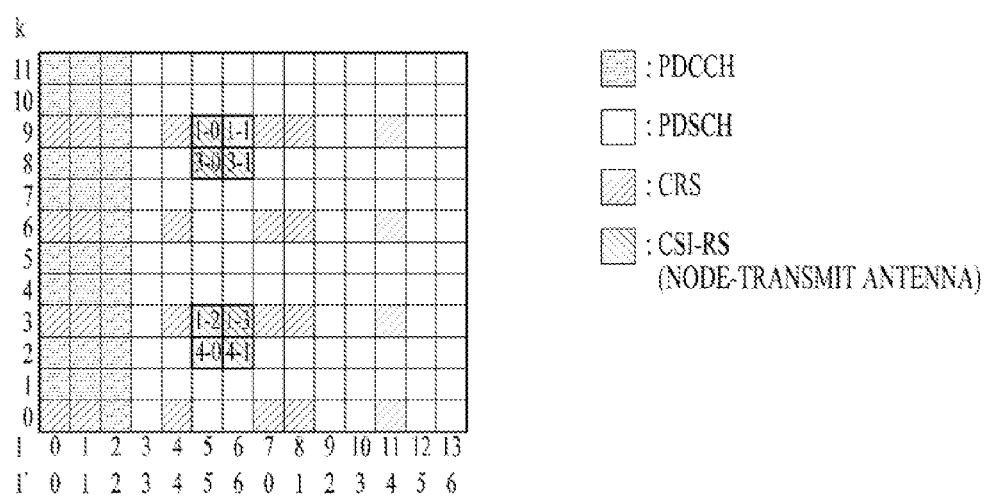
FIG. 4 illustrates exemplary CSI-RS allocation for a plurality of nodes.

FIG. 4 illustrates exemplary CSI-RS allocation for a plurality of nodes. In FIG. 4, a resource denoted by x-y indicates a resource occupied by a CSI-RS transmitted by antenna port y of node x.

In a DMNS in which a plurality of nodes is arranged, a UE may receive CSI-RS(s) from one or more nodes. For example, referring to FIG. 2, if the UE is connected to the macro BS (node 1) having four antenna ports and node 3 and node 4 each having two antenna ports, the UE may receive CSI-RSs from node 1, node 3, and node 4. The BS may allocate CSI-RS configuration 0 among CSI-RS configurations for 8 CSI-RS ports to indicate node 1, node 3, and node 4. Referring to FIG. 4, CSI-RS resources of CSI-RS configuration 0 may be mapped in order of node indexes and antenna ports.

Meanwhile, in the DMNS in which a plurality of nodes is arranged, it may be favorable, in terms of overall network performance improvement, to transmit a PDSCH with high transmit power to some UEs and transmit a PDSCH with low transmit power to the other UEs according to scheduling. For example, referring to FIG. 4, in some cases, node 1, node 3, and node 4 transmitting CSI-RSs in CSI-RS configuration 0 may transmit PDSCHs with different transmit powers to obtain advantageous network performance. In this case, the UE simultaneously receives CSI-RS resources having different powers. Thus, in the case in which some nodes use high transmit power and the other nodes use low transmit power, UEs of nodes using low transmit power (hereinafter, low power nodes) are subject to interference by nodes using high transmit power (hereinafter, high power nodes). However, if a plurality of nodes transmits downlink signals at different transmit powers, a UE cannot be aware of which nodes are high power nodes and which nodes are low power nodes. Namely, the UE cannot accurately estimate a channel state for the plurality of nodes. Since a network performs scheduling based on CSI fed back by the UE, accurate CSI estimation serves as a decisive role in determining network performance.

Accordingly, the present invention proposes providing a UE with RS power information for each of plurality of nodes to enable the UE of a DMNS to accurately estimate a channel. The power information may be information indicating a power ratio of an RS and a data signal on a node basis. For example, the BS may inform the UE on a node basis of information indicating the ratio (hereinafter, $P_c$) of PDSCH energy per resource element (EPRE) to CSI-RS EPRE. As another embodiment, the network (or BS) may inform the UE of power information per node group, distinguished according to a predetermined reference. For example, the BS may inform the UE of $P_c$ information per node group composed of nodes having the same $P_c$. Referring to FIG. 4, assuming that a transmit power class of node 1 is different from a transmit power class of each of node 3 and node 4, the BS may transmit bitmap information {1, 0, 0} regarding different transmit power classes of node 1 and nodes 3 and P, information {3, 0} to the UE connected to node 1 and nodes 3 and 4. The UE can be aware that $P_c$ of 3 dB is applied to node 1 and $P_c$ of 100 dB is applied to node 3 and node 4 based on the bitmap information and the $P_c$ information. In other words, if node 1 transmits a CSI-RS at the ratio of transmit power of PDSCH EPRE to CSI-RS EPRE of 2:1 and node 3 and node 4 transmit CSI-RSs at 1:1, the UE calculates CSI under the assumption that the CSI-RS RE and PDSCH RE are transmitted with the difference of 3 dB and the CSI-RS and a PDSCH signal from node 3 and node 4 are transmitted with the same strength. That is, $P_c$ indicates the ratio of PDSCH EPRE to CSI-RS EPRE assumed when the UE derives CSI feedback. $P_c$ may have any one value within a predetermined range. For example, $P_c$ may have one value among −8 dB to 15 dB in 1 dB increments.

Meanwhile, permission of variation in transmit power of a PDSCH according to a subframe may be favorable for overall performance improvement. For example, a specific node may be configured such that a PDSCH with high transmit power is transmitted in odd-numbered subframes and a PDSCH with low transmit power is transmitted in even-numbered subframes. As another example, to eliminate interference between contiguous cells, a downlink signal may be transmitted at low transmit power in specific subframes. Thus, if the network operates such that transmit power varies with a subframe, each node may have two or more $P_c$ values. The BS may inform the UE of a plurality of $P_c$ values applied to a corresponding node with respect to nodes having different transmit powers according to a subframe, i.e. over time. The UE may derive/estimate CSI for a corresponding subframe(s) by applying a corresponding $P_c$ value among the plurality of $P_c$ values.

In embodiments of the present invention, $P_c$ may be the ratio of PDSCH RE and CSI-RS RE on a CSI-RS port basis.

Meanwhile, information indicating actual transmit power rather than a power ratio may be provided to the UE as RS power information for each of plurality of nodes. For example, the BS may transmit, to the UE, an actual transmit power value at which a CSI-RS port per node transmits a CSI-RS RE and an actual transmit power value at which a CSI-RS port per node transmits a PDSCH RE, as the RS power information. Alternatively, an actual transmit power value of a CSI-RS RE may be transmitted to the UE as the RS power information, together with P, for each node, e.g. for each CSI-RS configuration.

According to any one the aforementioned embodiments, the UE may derive CSI for a downlink channel formed between the plurality of nodes and the UE and transmit the CSI to the BS. Alternatively, the UE may derive CSI for downlink channels between each of the plurality of nodes and the UE and transmit the CSI to the BS.

In a conventional system, parameters for only one single non-zero CSI-RS configuration per cell have been provided to the UE. However, according to the embodiments of the present invention, parameters for a plurality of (non-zero) CSI-RS configurations may be provided to the UE and a plurality of power parameters for one (non-zero) CSI-RS configuration may be provided to the UE. Therefore, according to the embodiments of the present invention, the UE receiving signals from a plurality of nodes can more accurately perform channel state estimation for the plurality of nodes. Then, the BS can accurately recognize a downlink channel state of nodes controlled thereby and overall network performance can be improved.

Figure 5:
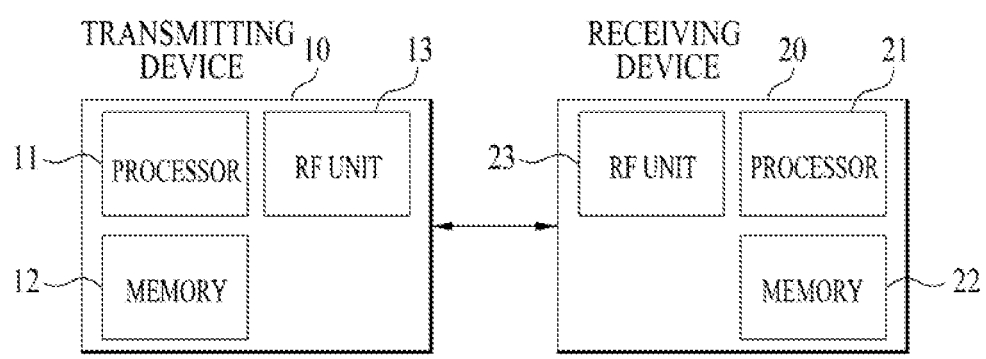
FIG. 5 is a block diagram illustrating elements of a transmitting device 10 and a receiving device 20 for implementing the present invention.

FIG. 5 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 generally control the overall operation of various modules in the transmitting device and the receiving device. Especially, the processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. If the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each of signals received through receive antennas into a baseband signal. The processor 21 decodes and demodulates the radio signals received through the receive antennas and restores data that the transmitting device 10 originally desires to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted in correspondence to a corresponding antenna defines an antenna viewed from the receiving device 20 and enables the receiving device 20 to perform channel estimation for the antenna, irrespective of whether it is a single radio channel from one physical antenna or a composite channel from a plurality of physical antenna elements including the antenna. In other words, the antenna is defined such that a channel carrying a symbol of the antenna may be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in uplink and as the receiving device 20 in downlink. In the embodiments of the present invention, a BS operates as the receiving device 20 in uplink and as the transmitting device 10 in downlink. Hereinafter, the processor, memory, and RF unit included in the BS will be referred to as a BS processor, a BE memory, and a BS RF unit, respectively and the processor, memory, and RF unit included in the UE will be referred to as a UE processor, a UE memory, and a UE RF unit, respectively to describe the embodiments of the present invention. In the present invention, the BS processor may be a processor in the BS or a BS controller connected to the BS via cables or dedicated lines to control the BS. The BS RF unit may be included in a node at which the BS is located (e.g. node 1 of FIG. 2) or may be included in a distributed node.

In a DMNS, the BS processor may allocate different CSI-RS configurations or CSI-RS subframe configurations to a plurality of nodes communicating with the UE. The BS processor may allocate different CSI-RS transmit powers to the plurality of nodes. The BS processor may control the BS RF unit to transmit CSI-RS configuration information indicating one or more CSI-RS configurations, CSI-RS subframe configuration information indicating one or more CSI-RS subframe configurations, and/or power information indicating one or more CSI-RS transmit powers to the UE. The transmit power information may be information indicating the ratio $P_c$ of PDSCH EPRE to CSI-RS EPRE. If the BS processor configures the plurality of nodes to transmit CSI-RSs at different transmit power ratios, the BS processor may control the BS RF unit to transmit $P_c$ information indicating $P_c$ values corresponding to the number of nodes. Alternatively, the BS processor may configure $P_c$ information per node group composed of a node(s) having the same $P_c$ and control the BS RF unit to transmit the $P_c$ information. In the case of nodes having different CSI-RS transmit powers according to a subframe, the $P_c$ information may include a plurality of $P_c$ values for the nodes. The BS processor may configure actual transmit power values, for example, information indicating an actual transmit power value of a CSI-RS RE and information indicating an actual transmit power value of a PDSCH RE as transmit power information, instead of the $P_c$ information. Alternatively, the BS processor may configure an actual transmit power value of the CSI-RS RE as the transmit power information, together with $P_c$ for each node.

The BS processor controls a corresponding node or an RF unit of the corresponding node to transmit a CSI-RS according to a CSI-RS configuration configured for each node, a CSI-RS subframe configuration, and a CSI-RS transmit power.

The UE RF unit receives CSI information regarding a plurality of nodes to which the UE is connected (e.g. CSI-RS configuration information indicating one or more CSI-RS configurations, CSI-RS subframe configuration information indicating one or more CSI-RS subframe configurations, and/or power information indicating one or more CSI-RS transmit powers, used in the plurality of nodes) from the BS. The UE processor may recognize in which subframe and on which CSI-RS resource a CSI-RS is to be received, based on the CSI-RS information, and may be aware of a CSI-RS transmit power used in each of the plurality of nodes. The UE processor may receive a CSI-RS on a corresponding CSI-RS resource from each of the plurality of nodes in a CSI-RS subframe and derive CSI for a downlink channel formed between the plurality of nodes and the UE or CSI for downlink channels formed between each of the plurality of nodes and the UE, using the CSI-RS power information. The UE processor may control the UE RF unit to transmit the CSI to the BS.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving channel state information reference signals (CSI-RSs) at a user equipment, the method comprising:
receiving, by the user equipment, multiple configurations and power information for each of the multiple configurations;
receiving, by the user equipment, the CSI-RSs corresponding to the multiple configurations; and
deriving, by the user equipment, channel state information based on the power information and CSI-RSs,
wherein the multiple configurations are different at least in CSI-Rs configurations, in CSI-RS subframe configurations or in CSI-RS port indexes, and
wherein for at least one configuration among the multiple configurations, the power information includes a first ratio of downlink data transmit power to reference signal transmit power of a first subframe set associated with the at least one configuration and a second ratio of downlink data transmit power to reference signal transmit power associated with the at least one configuration.

2. The method according to claim 1, wherein the multiple configurations correspond to a plurality of nodes, respectively.

3. The method according to claim 1, wherein the first ratio is for CSI-RSs of even-numbered subframes, and the second ratio is for the CSI-RSs of odd-numbered subframes.

4. A user equipment for receiving channel state information reference signals (CSI-RSs), the user equipment comprising:
a radio frequency (RF) unit configured to transmit or receive a radio signal; and
a processor configured to:
control the RF unit to receive multiple configurations and power information for each of the multiple configurations;
control the RF unit to receive the CSI-RSs corresponding to the multiple configurations; and
derive channel state information based on the power information and the CSI-RSs,
wherein the multiple configurations are different at least in CSI-RS configurations, in CSI-RS subframe configurations of in CSI-RS port indexes, and
wherein for at least one configuration among the multiple configurations, the power information includes a first ratio of downlink data transmit power to reference signal transmit power for a first subframe set associated with the at least one configuration and a second ratio of downlink data transmit power to reference signal transmit power associated with the at least one configuration.

5. The user equipment according to claim 4, wherein the multiple configurations correspond to a plurality of nodes, respectively.

6. The user equipment according to claim 4, wherein the first ratio is for CSI-RSs of even-numbered subframes, and the second ratio is for CSI-RSs of odd-numbered subframes.

7. A method for transmitting channel state information reference signals (CSI-RSs) at a base station, the method comprising:
transmitting, by the base station, multiple configurations and power information for each of the multiple configurations to a user equipment;
transmitting, by the base station, the CSI-RSs according to the multiple configurations and the power information; and
receiving channel state information for the multiple configurations from the user equipment,
wherein the multiple configurations are different at least in CSI-Rs configurations, in CSI-Rs subframe configurations or in CSI-RS port indexes, and
wherein, for at least one configuration among the multiple configurations, the power information includes a first ratio of downlink data transmit power to reference signal transmit power for a first subframe set associated with the at least one configuration and a second ratio of downlink data transmit power to reference signal transmit power associated with the at least one configuration.

8. A base station for transmitting channel state information reference signals (CSI-RSs), the base station comprising:
a radio frequency (RF) unit configured to transmit or receive a radio signal, and
a processor configured to:
control the RF unit to control the RF unit to transmit multiple configurations and power information for each of the multiple configurations to a user equipment;
control the RF unit to transmit the CSI-RSs according to the multiple configurations and the power information; and
control the RF unit to receive channel state information for the multiple configuration from the user equipment,
wherein the multiple configurations are different at least in CSI-RS configurations, in CSI-RS subframe configurations or in CSI-Rs port indexes, and
wherein, for at least one configuration among the multiple configurations, the power information includes a first ratio of downlink data transmit power to reference signal transmit power for a first subframe set associated with the at least one configuration and a second ratio of downlink data transmit power to reference signal transmit power associated with the at least one configuration.

* * * * *